United States Patent
Downs et al.

(10) Patent No.: US 7,837,815 B2
(45) Date of Patent: Nov. 23, 2010

(54) ADHESIVE SEGMENT INDEXING METHOD AND APPARATUS AND ROLL OF ADHESIVE SEGMENTS FOR USE THEREWITH

(75) Inventors: John P. Downs, Colgate, WI (US); Burton J. Peterson, Waterford, WI (US); Richard A. Thiede, Mercer, WI (US)

(73) Assignee: Glue Dots International LLC, New Berlin, WI (US)

( * ) Notice: Subject to any disclaimer, the term of this patent is extended or adjusted under 35 U.S.C. 154(b) by 716 days.

(21) Appl. No.: 10/920,151

(22) Filed: Aug. 17, 2004

(65) Prior Publication Data

US 2005/0266198 A1 Dec. 1, 2005

Related U.S. Application Data

(63) Continuation-in-part of application No. 10/360,457, filed on Feb. 8, 2003, now abandoned, and a continuation-in-part of application No. 10/360,395, filed on Feb. 8, 2003, now Pat. No. 7,195,049, which is a continuation-in-part of application No. 10/125,012, filed on Apr. 18, 2002, now Pat. No. 6,686,016, and a continuation-in-part of application No. 09/998,950, filed on Nov. 15, 2001, now Pat. No. 6,640,864, which is a continuation of application No. 09/363,200, filed on Jul. 29, 1999, now Pat. No. 6,319,442, which is a continuation-in-part of application No. 08/909,189, filed on Aug. 11, 1997, now Pat. No. 5,935,670.

(60) Provisional application No. 60/036,896, filed on Feb. 6, 1997.

(51) Int. Cl.
*B32B 41/00* (2006.01)

(52) U.S. Cl. .................................. 156/64; 156/351

(58) Field of Classification Search .................... 156/64, 156/351, 360, 361
See application file for complete search history.

(56) References Cited

U.S. PATENT DOCUMENTS 2,278,297 A 12/1938 Flood (Continued)

FOREIGN PATENT DOCUMENTS

DE 4319023 C1 9/1994

(Continued)

OTHER PUBLICATIONS

Statement by Applicant in Compliance with 37 C.F.R. § 1.56, dated Oct. 11, 2005.

*Primary Examiner*—George R Koch, III
(74) *Attorney, Agent, or Firm*—Reinhart Boerner Van Deuren S.C.

(57) ABSTRACT

An automated system and method for applying thermoplastic adhesives to work pieces from a roll of adhesive segments applied to an adhesive segment-laden carrier release tape. The present invention may be implemented in a system that automatically advances the adhesive segment-laden carrier release tape to position an adhesive segment thereon in the apparatus for application thereof to a work piece. Accurate indexing and advancement of the adhesive segment-laden carrier release tape preferably is provided by optical indexing of the carrier release tape, e.g., by the optical detection of a transverse line or other index marking printed or otherwise provided on the adhesive segment carrier release along with the adhesive segments deposited thereon.

13 Claims, 8 Drawing Sheets

U.S. PATENT DOCUMENTS

| | | | |
|---|---|---|---|
| 2,373,092 A | 4/1945 | Avery | |
| 2,847,843 A | 3/1950 | Bemmels | |
| 2,754,994 A | 7/1956 | Cole | |
| 2,838,171 A | 6/1958 | Kaspar | |
| 2,879,547 A | 3/1959 | Morris | |
| 2,912,140 A | 11/1959 | Cole | |
| 3,068,881 A | 12/1962 | Krueger | |
| 3,225,916 A | 12/1965 | Field et al. | |
| 3,239,403 A | 3/1966 | Williams et al. | |
| 3,267,623 A | 8/1966 | Block | |
| 3,308,002 A | 3/1967 | Bremer et al. | |
| 3,445,263 A | 5/1969 | Alexander | |
| 3,457,919 A | 7/1969 | Harbard | |
| 3,484,883 A | 12/1969 | Moline et al. | |
| 3,582,438 A | 6/1971 | Harbouor | |
| 3,587,148 A | 6/1971 | Ottavan | |
| 3,595,204 A | 7/1971 | McIntyre et al. | |
| 3,619,324 A | 11/1971 | Sato et al. | |
| 3,736,281 A | 5/1973 | Russell | |
| 3,741,486 A | 6/1973 | Kawamatu | |
| 3,741,786 A | 6/1973 | Torrey | |
| 3,877,959 A | 4/1975 | Weiss | |
| 3,881,041 A | 4/1975 | Glienke | |
| 3,932,326 A | 1/1976 | Hoh | |
| 3,932,328 A | 1/1976 | Korpman | |
| 3,956,223 A | 5/1976 | Chiang | |
| 3,969,181 A | 7/1976 | Seabold | |
| 3,997,702 A | 12/1976 | Schurb et al. | |
| 4,002,794 A | 1/1977 | Schwarcz | |
| 4,100,852 A | 7/1978 | Hamisch, Jr. | |
| 4,116,746 A | 9/1978 | Hamisch, Jr. | |
| 4,211,805 A | 7/1980 | Chamberlin | |
| 4,272,311 A | 6/1981 | D'Angelo et al. | |
| 4,294,357 A | 10/1981 | Stevens et al. | |
| 4,387,831 A | 6/1983 | McNally | |
| 4,440,830 A | 4/1984 | Wempe | |
| 4,452,667 A | 6/1984 | Chang | |
| 4,470,864 A | 9/1984 | Haden et al. | |
| 4,508,588 A | 4/1985 | Parrish | |
| 4,537,934 A | 8/1985 | Fock et al. | |
| 4,543,099 A | 9/1985 | Bunnelle et al. | |
| 4,552,608 A * | 11/1985 | Hoffmann et al. | 156/351 |
| 4,560,087 A | 12/1985 | Sato et al. | |
| 4,562,102 A | 12/1985 | Rabuse et al. | |
| 4,699,685 A | 10/1987 | Sato | |
| 4,718,971 A | 1/1988 | Summers | |
| 4,719,261 A | 1/1988 | Bunnelle et al. | |
| 4,731,066 A | 3/1988 | Korpman | |
| 4,804,437 A | 2/1989 | Tirtoprodjo et al. | |
| 4,820,446 A | 4/1989 | Prud'Homme | |
| 4,822,687 A | 4/1989 | Kessel et al. | |
| 4,846,924 A | 7/1989 | Morrison | |
| 4,851,074 A | 7/1989 | Hiromichi | |
| 4,851,278 A | 7/1989 | Enanoza | |
| 4,959,008 A | 9/1990 | Wasulko | |
| 4,961,804 A | 10/1990 | Aurichio | |
| 4,965,113 A | 10/1990 | Jones et al. | |
| 4,977,006 A | 12/1990 | Smith et al. | |
| 4,985,499 A | 1/1991 | Nishikawa et al. | |
| 5,045,145 A | 9/1991 | Becker | |
| 5,049,434 A | 9/1991 | Wasulko | |
| 5,133,827 A | 7/1992 | Ratermann | |
| 5,158,818 A | 10/1992 | Aurichio | |
| 5,202,169 A | 4/1993 | Spendlove | |
| 5,254,206 A | 10/1993 | Wing | |
| 5,316,613 A | 5/1994 | Samuelson et al. | |
| 5,344,681 A | 9/1994 | Calhoun et al. | |
| 5,456,792 A | 10/1995 | Rodriguez et al. | |
| 5,486,254 A * | 1/1996 | Gallagher et al. | 156/229 |
| 5,489,453 A | 2/1996 | Friesch | |
| 5,575,097 A | 11/1996 | Chou et al. | |
| 5,575,202 A | 11/1996 | Pfeiffer | |
| 5,683,545 A | 11/1997 | Goodwin et al. | |
| 5,685,944 A | 11/1997 | Nose et al. | |
| 5,738,755 A | 4/1998 | Hartman | |
| 5,779,852 A | 7/1998 | Haney et al. | |
| 5,875,715 A | 3/1999 | Hamisch, Jr. et al. | |
| 5,906,443 A | 5/1999 | Goodwin et al. | |
| 5,910,227 A | 6/1999 | Mistyurik et al. | |
| 5,934,189 A | 8/1999 | Mistyurik et al. | |
| 5,935,670 A | 8/1999 | Downs | |
| 5,988,249 A | 11/1999 | Mistyurik et al. | |
| 6,102,098 A | 8/2000 | Randazzo | |
| 6,143,105 A | 11/2000 | Nash et al. | |
| 6,171,439 B1 | 1/2001 | Groeneweg | |
| 6,206,072 B1 | 3/2001 | Orihara et al. | |
| 6,230,780 B1 | 5/2001 | Rietheimer | |
| 6,280,565 B1 | 8/2001 | Underwood | |
| 6,319,442 B1 | 11/2001 | Downs | |
| 6,363,990 B1 | 4/2002 | Kozaki | |
| 6,433,055 B1 | 8/2002 | Kleyer et al. | |
| 6,439,289 B1 | 8/2002 | Schlotthauer | |
| 6,527,888 B2 | 3/2003 | Williams et al. | |
| 6,596,105 B2 * | 7/2003 | Kendall, Jr. | 156/64 |
| 6,634,400 B2 | 10/2003 | Barbosa | |
| 6,640,864 B2 | 11/2003 | Downs | |
| 6,686,016 B2 | 2/2004 | Downs | |
| 2002/0059984 A1 | 5/2002 | Goodwin et al. | |
| 2003/0056869 A1 | 3/2003 | Tate et al. | |
| 2003/0084987 A1 | 5/2003 | Rodriguez et al. | |
| 2003/0116284 A1 | 6/2003 | Downs et al. | |
| 2004/0151861 A1 | 8/2004 | Downs | |
| 2004/0219332 A1 | 11/2004 | Dean et al. | |

FOREIGN PATENT DOCUMENTS

| | | |
|---|---|---|
| DE | 4319023 C1 | 9/1994 |
| DE | 20210691 U1 | 9/2002 |
| DE | 20210691 U1 | 9/2002 |
| EP | 0609826 A | 8/1994 |
| EP | 0609826 A | 8/1994 |
| EP | 0619189 A2 | 10/1994 |
| EP | 0619189 A2 | 10/1994 |
| EP | 0619189 A3 | 10/1994 |
| EP | 0619189 A3 | 10/1994 |
| EP | 1233046 A | 8/2002 |
| EP | 1233048 A | 8/2002 |
| EP | 1445226 A3 | 9/2004 |
| EP | 1445228 A3 | 9/2004 |
| GB | 681096 | 10/1952 |
| GB | 780291 | 7/1957 |
| GB | 936447 | 9/1963 |
| GB | 936448 | 9/1963 |
| GB | 978566 | 12/1964 |
| GB | 1404925 | 9/1975 |
| GB | 2208825 | 4/1989 |
| GB | 2361442 | 10/2001 |
| GB | 2381442 | 10/2001 |
| GB | 2397258 A | 7/2004 |
| GB | 2397258 A | 7/2004 |
| JP | 2011684 | 1/1990 |
| JP | 2001 018586 A | 1/2001 |
| WO | WO92/19447 | 11/1992 |

\* cited by examiner

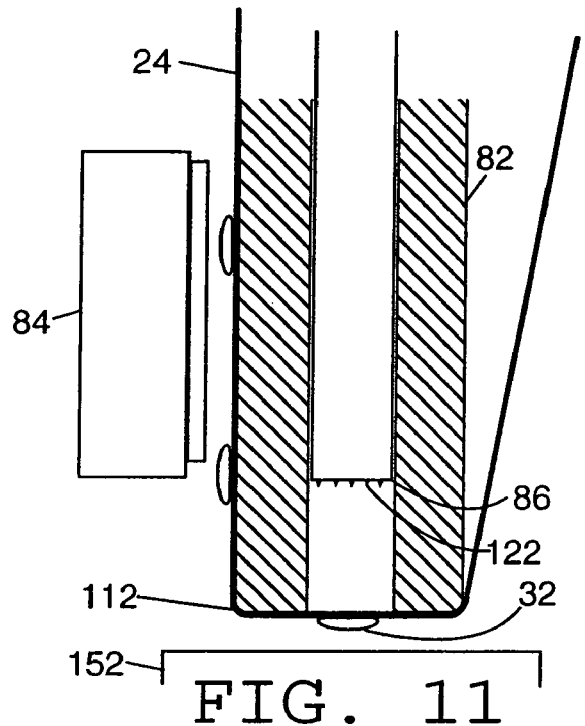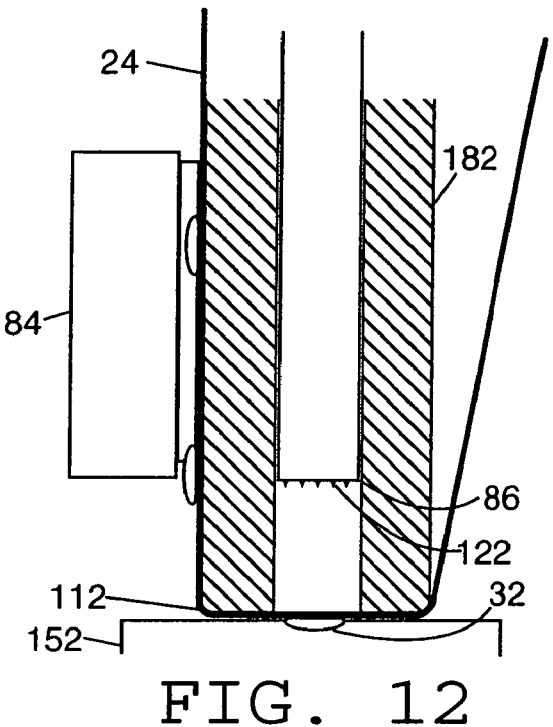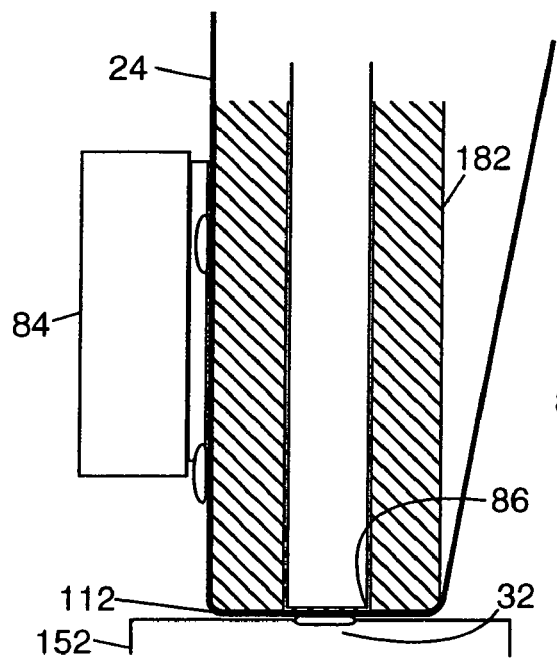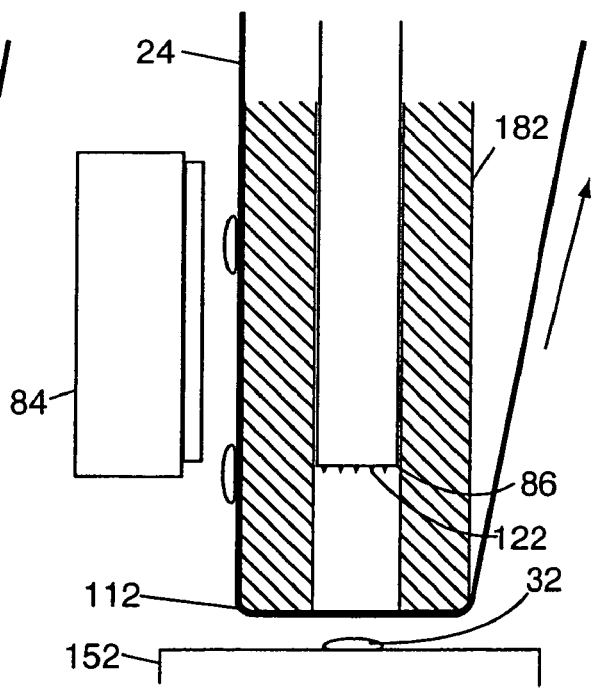

ADHESIVE SEGMENT INDEXING METHOD AND APPARATUS AND ROLL OF ADHESIVE SEGMENTS FOR USE THEREWITH

This patent application is a continuation-in-part of U.S. patent application Ser. No. 10/360,457, filed on Feb. 8, 2003, now abandoned and is also a continuation-in-part of U.S. patent application Ser. No. 10/360,395, also filed on Feb. 8, 2003, now U.S. Pat. No. 7,195,049 both of which are continuations-in-part of U.S. patent application Ser. No. 10/125,012, filed on Apr. 18, 2002, now U.S. Pat. No. 6,686,016, and continuations-in-part of U.S. patent application Ser. No. 09/998,950, filed on Nov. 15, 2001, now U.S. Pat. No. 6,640,864, both of which are continuations of U.S. patent application Ser. No. 09/363,200, filed on Jul. 29, 1999, now U.S. Pat. No. 6,319,442, which is in turn a continuation-in-part of U.S. patent application Ser. No. 08/909,189, filed on Aug. 11, 1997, now U.S. Pat. No. 5,935,670, which in turn claims the benefit of U.S. Provisional Patent Application No. 60/036,896, filed on Feb. 6, 1997.

FIELD OF THE INVENTION

The present invention pertains generally to pressure-sensitive adhesives and their application to desired surfaces, and, more specifically, to applicator systems and methods for use in combination with rolls of indexed carrier release tape having pressure-sensitive adhesive segments attached thereto which may be individually dispensed using such applicator systems and methods.

BACKGROUND OF THE INVENTION

The term "adhesive" generically describes a class of "sticky" materials. Adhesives and adhesive applicators owe their innovation to the industrial revolution, which resulted in an explosion of technical and scientific breakthroughs. The breakthroughs of the industrial revolution included the introduction of new materials and ingredients for use in formulating market-specific and industry-specific adhesives. In creating novel adhesives, companies have diligently considered desirable qualities such as adhesive flexibility, toughness, minimum curing or setting time, and temperature and chemical resistance. Today, the technology and science of adhesives and apparatuses for their application is the foundation for a multi-billion dollar industry with over seven hundred companies competing for market share. More importantly, these companies strive to create and introduce novel adhesives as well as apparatuses and method for the simple, efficient, inexpensive, and safe application of adhesives.

One of the most significant adhesive technical breakthroughs of the past century has been the introduction of pressure-sensitive thermoplastic adhesives. Thermoplastic adhesives have excellent adhering qualities; they can be softened by heating and firmed by cooling. These characteristics help thermoplastic adhesives produce waterproof, resilient, and long-lasting flexible bonds. Thermoplastic adhesives have what is known as a "plastic memory" meaning that each time a thermoplastic adhesive is heated, it can be molded into any desired form.

Thermoplastic adhesives have significant applications in today's industry. For example, in the preparation of mass mailings, marketers often desire to attach a card, such as a credit card or the like, to a carrier document so that a consumer can peel the card easily from the carrier document. One method of making such an attachment involves the use of a pressure-sensitive, thermoplastic adhesive. For example, by using a heating container to melt the thermoplastic adhesive and a metering pump to dispense it during the printing or collating process, a portion of thermoplastic adhesive can be metered onto the carrier document and a credit card pressed against it.

In addition to the uses for thermoplastic adhesives described above, industry is now finding additional uses for them. For example, thermoplastic adhesives are routinely used and applied as small bond points to eliminate the use of mechanical fasteners, such as staples, screws, rivets, clips, snaps, nails, and stitching. Thermoplastic adhesives are also extensively used in the packaging and manufacture of cartons, boxes, and corrugated boards, bags, envelopes, disposable products (diapers and other paper products), cigarettes, labels, and stamps. In fact, today's demand for thermoplastic adhesives extends to very broad fields of use.

Increasingly, industry demands thermoplastic adhesive application at on-site locations from simple-to-use, efficient, and safe dispensing apparatuses. In providing thermoplastic adhesives for application to a surface, the previously known embodiments have contemplated all of the following thermoplastic adhesive carrying media and application methods: hot-melt "glue-gun" as adhesive dispensers; adhesive segment-laden carrier release tape for "by hand" adhesive application; use of a plunger-like dispensing system in combination with adhesive segment-laden carrier release tape; use of a cardboard box applicator system for use in combination with adhesive segment-laden carrier release tape; an electric automated dispensing system for use with adhesive segment-laden carrier release tape, which is activated by the pressing of a palm-sized push button; a hand-held mechanical adhesive segment applicator apparatus with a mechanical hand-operated trigger for advancing an adhesive segment-laden carrier release tape contained therein, and a stand for holding such a hand-held mechanical adhesive segment applicator with a powered system for activating the mechanical trigger automatically as a work piece is brought in contact with the adhesive segment applicator to apply an adhesive segment thereto.

Using a "glue gun" device is an inefficient, difficult, and at times unsafe method of applying thermoplastic adhesives to a desired surface. First, the cost of using this equipment is relatively high. The apparatus and method are also inefficient consumers of both energy and glue. Specifically, the costs of the operation of such a dispenser (electrical usage, wasted glue from droppings) for only short periods of time outweigh any other potential advantages which may be realized. Safety is also an issue. Glue-gun devices are potentially unsafe because they include a heat source to heat a quantifiable supply of adhesive material to its melting point. A major drawback of using such an instrument is that the hot, molten thermoplastic adhesive can burn untrained users, and can also melt the substrate the user is applying the glue to. Finally, application of thermoplastic adhesives from a glue-gun does not enable the thermoplastic adhesive to withstand cold temperatures or to cool to a smooth surface, but instead will typically leave "spider webs" in the dried adhesive. In short, glue-gun applicators of the prior art are inefficient, difficult, and unsafe.

Many of the shortcomings of the glue-gun applicators of the prior art were overcome by U.S. Pat. No. 5,935,670 to Downs (the "'670 patent"), which patent is hereby incorporated herein by reference. The '670 patent discloses a method for presenting cold adhesive segments for application to a desired surface. The technology of the '670 patent focuses mainly on the manufacture of a clean, unaltered carrier release tape having first and second release surfaces with different coefficients of friction, and the application thereto of adhesive segments at periodic intervals. The adhesive segment-laden carrier release tape is then wound into a roll. This embodiment allows a user to apply the adhesive segments from the carrier release tape by hand.

Although the adhesive segment-laden carrier release tape taught in the '670 patent provides a highly innovative and commercially successful product, application of the adhesive segments from the release tape onto a work piece in an efficient manner remains a challenge. Specifically, the coiled adhesive segment-laden carrier release tape must be unrolled to present an adhesive segment for application. After the adhesive segment has been applied to the desired surface, the tape must be unrolled an additional distance to ready the next adhesive segment for application. Advancing the carrier release tape manually in this manner is time-consuming, and the "spent" carrier release tape must be either torn off and disposed of or left intact and in the way. Finally, dropping or unintentional uncoiling of the unused roll of adhesive segment-laden carrier release tape may also be a problem.

U.S. Pat. No. 6,319,442 to Downs (the "'442 patent") which patent is hereby incorporated herein by reference, further evolves the previously known adhesive segment-laden carrier release tape of the '670 patent. Like the '670 patent, the '442 patent also contemplates a carrier release tape, which has first and second release surfaces with different coefficients of friction, and the application thereto of adhesive segments at periodic intervals. But, unlike the '670 patent, the '442 patent contemplates a thermoplastic adhesive carrier release tape having a transverse line of slits or perforations precut across its transverse width and between the adhesive segments. The precut tape of the '442 patent thus allows individual portions of the carrier release tape and associated thermoplastic adhesives to be removed from the roll for manual application to a desired surface. While such an embodiment remedies the '670 patent's problem of having a length of uncut spent carrier release tape, the carrier release tape of the '442 patent (as well as of the '670 patent) does not lend itself to use in combination with a more efficient dispenser for application of the adhesive segments.

While the '670 and '442 Patents focus primarily on the creation of adhesive segment-laden carrier release tape, they also contemplate the use of the adhesive segment-laden carrier release tape in combination with numerous dispenser apparatuses. First, a plunger-like applicator, as detailed within both the '670 and '442 patents, proves manageable, but is essentially a manually operated device for applying adhesive segments to a work piece from an adhesive segment-laden carrier release tape. Another previously known thermoplastic adhesive applicator is the so-called box applicator. The box applicator encases a roll of adhesive segment-laden carrier release tape as disclosed within the '670 and '442 patents. The carrier release tape is advanced from the box applicator by hand. Exposed adhesive segments must be pressed between the surface to be glued and the top of the cardboard box applicator to ensure adherence. This application process exposes unspent adhesive segments to dust and other debris, which may cause the adhesive segments to lose their adhesive tack and damage or soil the desired surface. Furthermore, the box applicator is an entirely manually operated device.

Not all previously known devices for applying thermoplastic adhesive from adhesive segment-laden carrier release tapes are entirely manual in operation. Previously known semi-automated methods dispose of the need to advance manually the carrier release tape. For example, the box applicator described above may be modified to include a motor for automatically advancing the adhesive segment-laden carrier release tape from the box either at a fixed rate, corresponding to the rate at which a worker may comfortably press a work piece against the adhesive segments as they are dispensed, or in response to the pressing of a push button to activate the motor to advance the adhesive segment-laden carrier release tape by a selected amount.

A more advanced mechanical adhesive segment applicator apparatus and method is described in U.S. patent application Ser. Nos. 10/360,395 and 10/360,457, filed on Feb. 8, 2003, and U.S. patent application Ser. No. 10/368,231, filed on Feb. 18, 2003, all of which are assigned to the assignee of the present application and the disclosures of which are incorporated herein by reference. These patent applications describe a hand held mechanical device for applying adhesive segments to a work piece from a carrier release tape having pressure-sensitive adhesive segments attached thereto. An indexing mechanism is provided on the carrier release tape to facilitate the dispensing of individual adhesive segments. The indexing mechanism consists of a plurality of patterned scores, cuts, or indentations located in the surface of the carrier release tape. The hand held adhesive segment applicator apparatus includes a mechanism for engaging the carrier release tape by the indexing mechanism to advance the tape to expose a new adhesive segment to be disposed therefrom each time a trigger mechanism on the applicator is manually actuated. The hand held adhesive segment applicator may be mounted on a stand that holds the applicator in a desired adjustable position. A pneumatic actuator may be provided to engage the trigger of the applicator to advance the carrier release tape to expose a new adhesive segment to be dispensed from the applicator automatically. The actuator may be activated by a trigger mechanism that is mounted near where the adhesive segment is dispensed from the applicator, to be engaged by a work piece as an adhesive segment is dispensed therefrom. Alternatively, the actuator may be activated by a hand or foot operated switch.

A limitation of previous systems and methods for applying thermoplastic adhesives to a work piece from an adhesive segment-laden carrier release tape is that operation of such systems and methods actually to apply the thermoplastic adhesive to a work piece is essentially manual. Even in systems that provide for the automatic or powered advancement of an adhesive segment-laden carrier release tape, the exposed adhesive segment must be applied to the work piece by either manually moving the applicator in contact with the work piece or manually moving the work piece in contact with the applicator. Such systems and methods for applying thermoplastic adhesives to work pieces from an adhesive segment-laden carrier release tape are thus not well suited to high speed high volume applications.

What is desired, therefore, is a system and method for the automatic application of thermoplastic adhesives to work pieces from an adhesive segment-laden carrier release tape for use in high-speed high-volume assembly line-like applications. Such an adhesive segment applicator should provide for assured automatic release of the adhesive segments from the carrier release tape onto a work piece. Such a system should also provide accurate indexing and advancement of the carrier release tape to ensure proper operation and positioning of the adhesive segment in the applicator device and on a work piece.

SUMMARY OF THE INVENTION

The present invention provides an automated system and method for applying thermoplastic adhesives to work pieces from a roll of adhesive segments applied to an adhesive segment-laden carrier release tape. The present invention may be implemented in a system that automatically advances the adhesive segment-laden carrier release tape to position an adhesive segment thereon in the apparatus for application thereof to a work piece. Accurate indexing and advancement of the adhesive segment-laden carrier release tape preferably is provided by optical indexing of the carrier release tape, e.g., by the optical detection of a transverse line or other index marking printed or otherwise provided on the adhesive segment carrier release along with the adhesive segments deposited thereon. The system may automatically apply the adhesive segment from the adhesive segment-laden carrier release tape onto a work piece by the use of an automatically actuated applicator head that contacts the surface of the adhesive segment-laden carrier release tape opposite the adhesive segment thereon to push the adhesive segment against the work piece to apply the adhesive segment to the work piece. In accordance with the present invention, the applicator head may include one or more sharp projections thereon that pierce through the carrier release tape, but not through the adhesive segment thereon, as the head presses the carrier release tape and adhesive segment against the work piece. It has been found that perforating the carrier release tape in this manner facilitates assured release of the adhesive segment from the carrier release tape and application of the adhesive segment to a work piece by the applicator head. Alternatively, the adhesive segment carrier release tape may be pre-perforated underneath each adhesive segment thereon, in which case the sharp projections need not be provided on the applicator head.

An automated adhesive segment indexing and applicator method and apparatus in accordance with the present invention employs a roll of adhesive segments provided on a differential carrier release strip or tape. A first surface of the carrier release tape has a coefficient of friction higher than the coefficient of friction of the second side of the carrier release tape, so that the first surface of the carrier release tape provides less release than does the second surface of the carrier release tape. Adhesive segments are deposited on the first, higher friction, surface of the carrier release tape, such that the adhesive segment-laden carrier release tape may be unwound with the adhesive segments remaining only on one surface of the carrier release tape.

In accordance with the present invention, the adhesive segment-laden carrier release tape includes optically detectable index markings thereon. Such index markings may include lines, e.g., black lines extending transversely across the carrier release tape, e.g., between the thermoplastic adhesive segments deposited thereon. Other optically detectable index markings may be printed on or otherwise applied to either one or both surfaces of the adhesive segment-laden carrier release tape. Such optically detectable markings may include physical perforations through the adhesive segment-laden carrier release tape. The index markings may be provided on the adhesive segment-laden carrier release tape as part of the process of depositing thermoplastic adhesive segments thereon, or may be provided by the manufacturer of the carrier release tape. In any case, the index markings must be accurately spaced along one or both surfaces of the differential release carrier release tape. During the application of the thermoplastic adhesive to the differential release carrier release tape the thermoplastic adhesive material is deposited thereon accurately in position relative to the index markings, e.g., by using optical detection of the index markings during the application process.

As will be discussed in more detail below, it has been found that, in an automatic adhesive segment applicator system in accordance with the present invention, an adhesive segment may be more assuredly removed from the adhesive segment-laden carrier release tape and applied to a work piece by an applicator head, if one or more holes or apertures are pierced through the adhesive segment-laden carrier release tape underneath the thermoplastic adhesive segments thereon. These perforations through the adhesive segment-laden carrier release tape may be formed during the process of forming a roll of adhesive segment-laden carrier release tape. This may be achieved, for example, by, after the thermoplastic adhesive segment has been applied onto the carrier release tape, and at least partially cooled, piercing the one or more perforations through the side of the carrier release tape opposite the adhesive segments. These perforations may be provided using an appropriate die, e.g., a rotary die with the appropriate sharp projections to pierce through the side of the carrier release tape opposite the adhesive segments and into, but preferably not through, the adhesive segment applied to the carrier release tape. As will be discussed in more detail below, such perforations through the carrier release tape may also be formed during the process of applying an adhesive segment from the tape onto a work piece by an adhesive segment applicator in accordance with the present invention.

An automatic adhesive segment applicator in accordance with the present invention preferably includes several components, all of which are mounted on a movable support structure. The components mounted on the movable support structure may include a supply spool, including a roll of adhesive segment-laden carrier release tape in accordance with the present invention, a tape guide, a take-up spool, a take-up spool drive motor, a tape clamp, an applicator head, pneumatic or other appropriate actuator mechanisms for the tape clamp and the applicator head, and an optical index detector. The applicator head may extend through a central aperture or bore formed through the tape guide and may have one or more sharp projections formed on the end thereof to pierce or otherwise provide perforations through the adhesive segment-laden carrier release tape on the side thereof opposite the adhesive segment during application thereof to a work piece to assure release of the adhesive segment from the release tape and application thereof to the work piece. The entire support structure on which these components are mounted, preferably is, in turn, mounted on a support base for movement with respect thereto toward and away from a work piece to which an adhesive segment from the adhesive segment-laden carrier release tape is to be applied. A pneumatic or other appropriate mechanism preferably is provided to move the support structure toward and away from the work piece by moving the support structure with respect to the support structure base. An appropriate controller preferably is provided to monitor and control system operation to apply automatically adhesive segments from the adhesive segment-laden carrier release tape onto a series of work pieces in a manner that assures release of the adhesive segments from the carrier release tape onto the work piece.

In operation, a roll of adhesive segment-laden carrier release tape, with optically detectable index markings formed thereon, as described above, is placed on the supply spool. The adhesive segment-laden carrier release tape is strung through the clamp and tape guide and onto the take-up spool. The take-up spool will accumulate the release tape after adhesive segments have been removed therefrom. The optical sensor is used to detect the index markings on the adhesive segment-laden carrier release tape to provide a signal to the system controller to indicate to the system controller the position of the tape, and, therefore, the position of the thermoplastic adhesive segments thereon, with respect to the tape guide and applicator head. Using this indexing information, the system controller may operate the motor driving the take-up spool to pull the adhesive segment-laden carrier release tape from the supply reel to position an adhesive segment on the release tape with respect to the applicator head for application thereby to a work piece. At this point, the one or more tape clamps may be closed and the entire support structure moved with respect to the support base to bring the thermoplastic adhesive segment adjacent to the work piece to which it is to be applied. The operation of the one or more tape clamps (e.g., either alone or in combination with pinch rollers) prevents undesirable movement of the release tape in the area of the adhesive segment to be applied to a work piece during the application process. The applicator head is then moved rapidly against the side of the adhesive segment-laden carrier release tape opposite the adhesive segment to push the adhesive segment against the surface of the work piece to which it is to be applied. Preferably the adhesive segment applicator head includes one or more sharp projections thereon which pierce through the surface of the adhesive segment-laden carrier release tape and into, but not through, the adhesive segment on the opposite side thereof. It is believed that the providing of these perforations through the release tape prevents air pressure between the adhesive segment and the release tape that might cause the adhesive segment not to be released from the tape onto the work piece in some cases as the applicator head is retracted. Preferably the extension and retraction of the applicator head to press the adhesive segment against the work piece, while providing perforations through the carrier release tape, may be performed twice in rapid succession to ensure release of the adhesive segment from the carrier release tape onto the work piece. After the adhesive segment is applied to the work piece in this manner the entire system support structure may be moved away from the work piece and the tape clamp released to allow free movement of the adhesive segment-laden carrier release tape supply spool. The controller may then operate the motor driving the take up spool to pull adhesive segment-laden carrier release tape from the supply spool to position the next adhesive segment on the carrier release tape in the proper position on the tape guide in front of the applicator head in preparation for the application thereof to the next work piece. The optical sensor is used to detect the index markings on the tape to provide feedback to the controller to ensure that the adhesive segment-laden carrier release tape is thus properly positioned for the next application.

This entire automatic application operation may be triggered manually by an operator, e.g., each time the operator presents a work piece to which a thermoplastic adhesive segment is to be applied by the device. Alternatively, the application operation, may be triggered automatically as part of an assembly line system, e.g., each time a work piece is detected to be in position for a thermoplastic adhesive segment to be applied thereto by the system.

Further objects, features, and advantages of the present invention will be apparent from the following detailed description thereof taken in conjunction with the accompanying drawings.

BRIEF DESCRIPTION OF THE DRAWINGS

FIGS. 11-14 illustrate schematically a portion of an exemplary adhesive segment applicator apparatus in accordance with the present invention showing various positions thereof during use of the apparatus to apply an adhesive segment from an adhesive segment-laden carrier release tape onto a work piece.

DETAILED DESCRIPTION OF THE INVENTION

The present invention provides a system and method for applying automatically adhesive segments from an adhesive segment-laden carrier release tape onto a work piece or series of work pieces, in a rapid and effective manner. The present invention may employ optical index markings on the carrier release tape to assure accurate positioning of the carrier release tape within the apparatus. The system also employs an automatic applicator method that ensures full and sure release of adhesive segments from the carrier release tape onto a work piece during the application process. Both the structure and operation of an exemplary applicator apparatus and method in accordance with the present invention, as well as the optically indexed carrier release tape used therein, and the manufacturer of such an adhesive segment-laden carrier release tape will now be described in detail herein.

Figure 1:
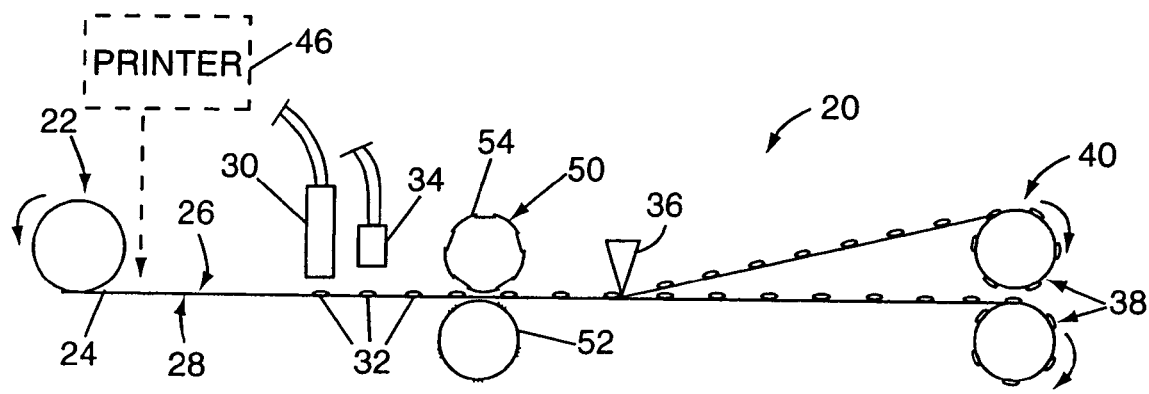
FIG. 1 is a schematic depiction of the manufacturing process for creating rolls of optically indexed adhesive segment-laden carrier release tape.

An exemplary process for manufacturing an adhesive segment-laden carrier release tape for use with an automatic adhesive segment applicator method and apparatus in accordance with the present invention will first be described with reference to FIG. 1. A system 20 for manufacturing an adhesive segment-laden carrier release tape in accordance with the present invention provides a back tensioned reel 22 holding a stock roll of differential release carrier release strip 24, having a first surface 26 and a second surface 28 opposite the first surface. The carrier release strip 24 may be made of paper that has a silicone release material on the first 26 and second 28 surfaces. The first surface 26 of the carrier release strip 24 has a coefficient of friction higher than the coefficient of friction of the second surface 28 of the carrier release strip 24, so that the first surface of the carrier release strip 26 provides less release than does the second surface of the carrier release strip 24.

The carrier release strip 24 is dispensed from the tensioned reel 22 with the first surface 26 facing upward to move beneath a pair of thermoplastic glue metering nozzles 30 (only one of which is visible in FIG. 1) supplied with thermoplastic adhesive by a metering pump (not shown) to dispense side-by-side adhesive segments 32 onto the first surface 26 as the first surface 26 moves past the nozzles 30. Air jets 34 directed on the first surface 26 then cool the adhesive segments 32 which are also cooled by natural convection as the carrier strip 24 moves along.

A slitting knife 36 divides the carrier strip 24 into multiple strips, each of which are then wound into coils 40 on take-up reels 38 under controlled tensioning. Capstan and idler wheels may also be provided so that the tension on reels 38 may be controlled independently of the tension provided by the supply reel 22.

The adhesive segments 32 are initially mounded high on the first surface 26 of the carrier strip 26, but as they are wound about the reel 38, each adhesive segment 32 is compressed beneath the second surface 28 of the carrier strip 24 of the next succeeding layer of the carrier strip 24 and the surface 26 of the layer of the carrier strip 24 on which it was deposited so as to flatten the adhesive segments into circular disks. Alternatively, a cooled drum having a non-stick surface may be used to flatten the adhesive segments 32 prior to winding on reel 38.

The differential release properties of surfaces 26 and 28, the fact that the adhesive segments 32 were initially applied in a hot state to surface 26 to cause better adherence, and the fact there is some cooling and hence "skinning over" of the adhesive segments 32 prior to winding on reel 38, all ensure that the adhesive segments 32 remain adhered to the first surface 26 as the coil 40 is unwound.

It should be noted that although the adhesive segments 32 described and illustrated herein are generally circular in shape, the present invention may be applied to and employ adhesive segments on the carrier release tape which have any other generally two dimensional shape. The shape of the adhesive segments may determined in general by the shape or other characteristics of the thermoplastic glue metering nozzles 30 used to apply the thermoplastic adhesive to the carrier strip 24.

Figure 2:
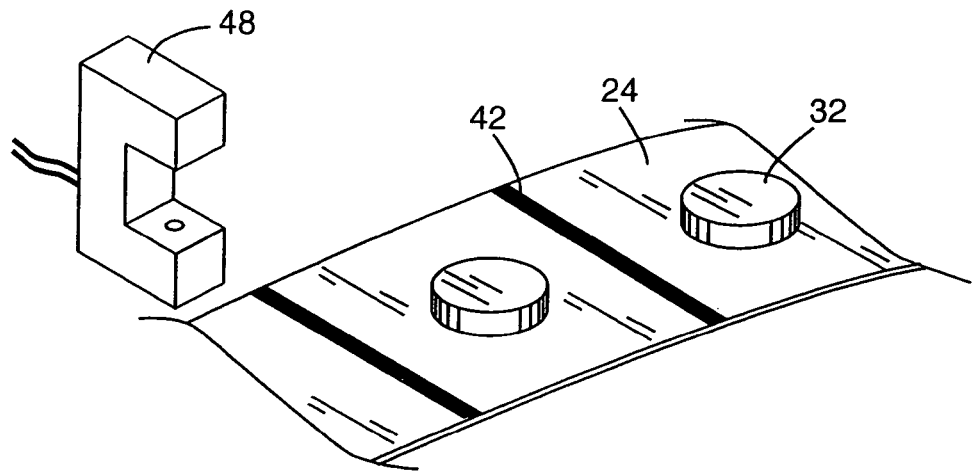
FIG. 2 is a perspective view of a section of a strip of the indexed adhesive segment-laden carrier release tape having optically detectable index marking lines extending transversely across the tape between thermoplastic adhesive segments thereon and an optical detector for detecting the index markings.
Figure 3:
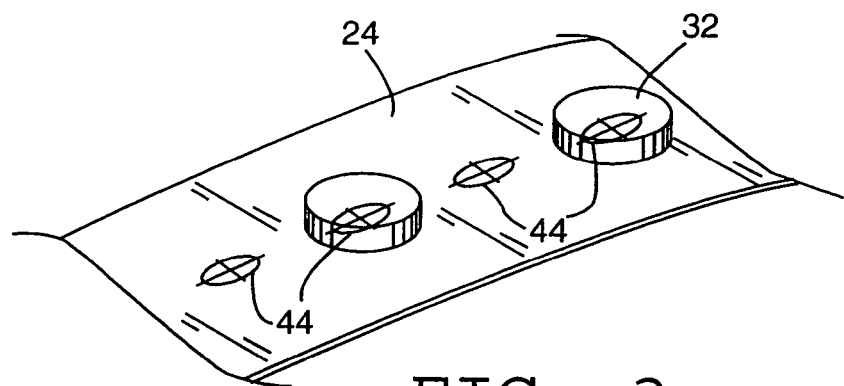
FIG. 3 is a figure similar to that of FIG. 2 showing other exemplary index markings on the adhesive segment-laden carrier release tape that may be used in accordance with the present invention.

In accordance with the present invention, the adhesive segment-laden carrier release tape 24 has a series of optically detectable index markings formed thereon. As will be described in more detail below, these optically detectable index markings are employed by an automatic adhesive segment applicator system in accordance with the present invention accurately to position adhesive segments for application by the applicator. As illustrated, for example, in FIG. 2, the optically detectable index markings may take the form of lines 42 formed on the carrier release tape 24 and extending transversely across the tape 24 between the adhesive segments 32 thereon. It should be understood that various different types of optically detectable index markings on the adhesive segment-laden carrier release tape 24 may be employed. For example, as illustrated in FIG. 3, printer registration marks 44 may be placed in regular positions along the carrier strip 24.

Whatever index markings 42, 44 are employed, the index markings 42, 44 may be formed on either or both surfaces 26, 28 of the carrier release tape 24. Besides being formed on one or both surfaces 26, 28 of the carrier release tape 24, the index markings may also be formed as perforations or other cuts or holes formed into the carrier release tape 24 that may be detected by an optical detector. As also illustrated in FIG. 3, the optically detectable index markings 44 may be positioned on the surfaces 26, 28 of the carrier release tape 24 not only between the adhesive segments 32 thereon, but also at different positions on the surfaces 26, 28 of the tape 24 with respect to the adhesive segments 32. For example, the adhesive segments 32 on the carrier release tape 24 may be made of a transparent thermoplastic material, in which case the index markings 44 may be positioned partially or entirely beneath the adhesive segments 32 on the carrier release tape 24 and still be detectable by an optical detector.

Preferably, the index markings 42, 44 may be pre-printed or otherwise formed on or in the carrier strip 24 before the adhesive segments 32 are deposited thereon. Alternatively, the index markings 42, 44 may be printed or otherwise formed on or in the carrier strip 24 as part of the process of or by the system 20 for depositing the adhesive segments 32 on the carrier strip 24. In such a case, for example, a printer 46, such as a laser printer or similar device, may be incorporated as part of the system 20 for creating the adhesive segment-laden carrier release tape, as illustrated in FIG. 1. In such a case, the printer 46, or other device, is used to place the index markings 42 and 44 on one or both surfaces of the carrier release tape 24 before the adhesive segments 32 are deposited thereon. Note that if the index markings to be used are physical indentations, punctures, or perforations in or through the carrier tape 24, a device other than the printer 46, such as a rotary die with a plurality of die blades attached around its outer circumference, may be used to form the index markings in the carrier release tape 24. In any case, whether printed or formed on the carrier release tape 24 by the manufacturer thereof or during the process of applying adhesive segments 32 to the carrier release tape 24, the optically detectable index markings preferably are formed on the carrier release tape 24 in a uniformly spaced apart longitudinal progression along the length of the carrier release tape 24.

During application of the adhesive segments 32 to the carrier release tape 24 it is important that the adhesive segments 32 be deposited on the carrier release tape 24 along the length of the carrier release tape 24 in a consistent relative position to the index markings formed on the carrier release tape 24. In order to achieve this precise control for the depositing of the adhesive segments 32 on the carrier release tape 24 an optical sensor 48, as illustrated in FIG. 2, or the like may be used to coordinate operation of the dispensing nozzles 30 so that the adhesive segments 32 are correctly placed with respect to the index markings on the carrier release tape 24.

It should be noted that, in some cases, the adhesive segments 32 deposited on the carrier strip 24 may be detectable, or made detectable, by an optical detector. Therefore, the adhesive segments 32 may themselves be used as index markings. For example, thermoplastic adhesives used to form the adhesive segments 32 may be formulated for varying properties such as degrees of tack, etc. The thermoplastic adhesives 32 may also be formulated for optical detectability, e.g., by compounding the thermoplastic adhesive with colors or other optically detectable characteristics. For example, luminescence under ultra-violet is a natural characteristic of some thermoplastic adhesives and this fact may be used to employ adhesive segments 32 formed of such thermoplastic adhesives as index markings themselves.

Throughout the remainder of this patent application the index markings printed, or otherwise formed in or on the carrier release tape 24 will be referred to with reference to the exemplary line index markings 42 described and illustrated with reference to FIG. 2. However, it should be understood, that the term "index markings" and "optically detectable indices" and any similar terms as used throughout this application, including in the claims, also refers to other type of index markings, whether printed on or formed in the carrier release tape 24 including optical detectable adhesive segments 32 deposited on the carrier release tape 24.

As will be discussed in more detail below, it has been found that for the application of adhesive segments 32 from an adhesive segment carrier release tape 24 onto a work piece using an automatic adhesive segment applicator in accordance with the present invention, release of the adhesive segment 32 from the carrier release tape 24 onto the work piece can better be assured if a portion of the carrier release tape 24 lying underneath or behind the adhesive segment 32 is punctured or perforated by one or more perforations. As will be described in more detail below, this perforating of the carrier release tape 24 behind an adhesive segment 32 may be performed by an automatic adhesive segment applicator in accordance with the present invention during the process of applying the adhesive segment 32 onto a work piece. Alternatively, one or more perforations may be formed in the carrier release tape 24 behind the adhesive segments 32 deposited thereon during the process of fabricating the adhesive segment-laden carrier release tape. For example, the adhesive segments 32 may be deposited upon a carrier release tape 24 in which such perforations have already been formed. However, since the adhesive segments 32 are deposited on the carrier release tape 24 in liquid form it is possible that the deposited liquid thermoplastic adhesive may seep through such preformed perforations in the carrier release tape 24 resulting in thermoplastic adhesive on both opposed surfaces 26 and 28 of the carrier release tape 24. Obviously this is unacceptable.

Figure 4:
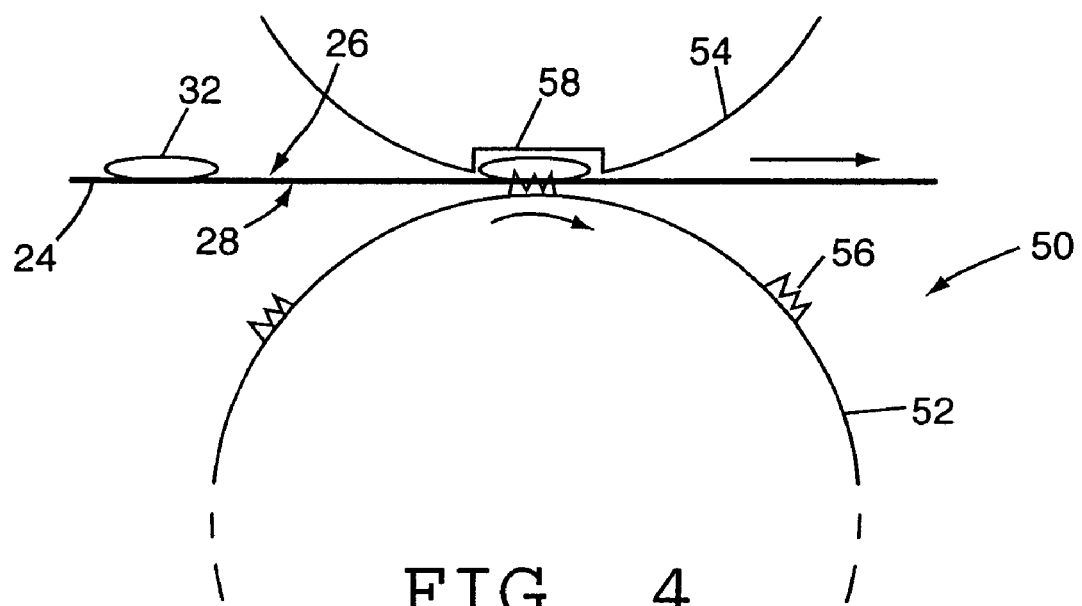
FIG. 4 is a detailed schematic cross sectional side view of an exemplary method for providing perforations through a surface of the adhesive segment carrier release tape opposite thermoplastic adhesive segments thereon during the manufacturing process thereof.

Alternatively, and preferably, if perforations are to be made through the carrier release tape 24 behind the adhesive segments 32 deposited thereon, such perforations are preferably formed through the carrier release tape 24 after the thermoplastic adhesive segments 32 have been deposited thereon and, at least partially, cooled and solidified. An exemplary system and method for forming such perforations in the carrier release tape 24 is illustrated schematically at 50 in FIGS. 1 and 4. In this case, a rotary die 52 and corresponding rotary anvil member 54 cooperate to perforate the carrier release tape 24 behind each adhesive segment 32 deposited on the carrier release tape 24. The rotary die 52 is typically drum-shaped with a plurality of blades or projections 56 formed around its outer circumference. The rotary anvil member 54 has corresponding recesses 58 formed therein. The carrier release tape 24 is effectively pinched between the rotary die 52 and the rotary anvil member 54. As the carrier release tape 24 passes between the rotary die 52 and the rotary anvil member 54 the projections 56 on the rotary die punch one or more holes in the carrier release tape 24 through the surface 28 of the carrier release tape 24 opposite the surface 26 on which the adhesive segment 32 is deposited. The projections 56 formed on the rotary die 52 preferably are long enough to penetrate through the carrier release tape 24 without penetrating entirely through the adhesive segment 32 deposited thereon. The notched rotary anvil member 54 provides support for the carrier release tape 24 as the release tape 24 is punctured by the rotary die 52. The recesses 58 on the rotating anvil member 54 are sized and shape such that, as the adhesive segment-laden carrier release tape 24 passes between the anvil member 54 and the rotary die 52. The adhesive segments 32 on the carrier release tape 24 are positioned within the recesses 58 such that the anvil member 54 provides support to the carrier release tape 24 around the adhesive segments 32 without actually contacting or crushing the adhesive segments 32 on the carrier release tape 24. It should be understood that although the embodiment illustrated and described herein shows perforating the carrier release tape 24 only at positions thereon which correspond to adhesive segments 32 deposited thereon, the perforations may, alternatively, be formed along the entire length of the carrier release tape 24, so long as at least one such perforation is made in the carrier release tape 24 at each location at which an adhesive segment 32 is deposited thereon.

Figure 5:
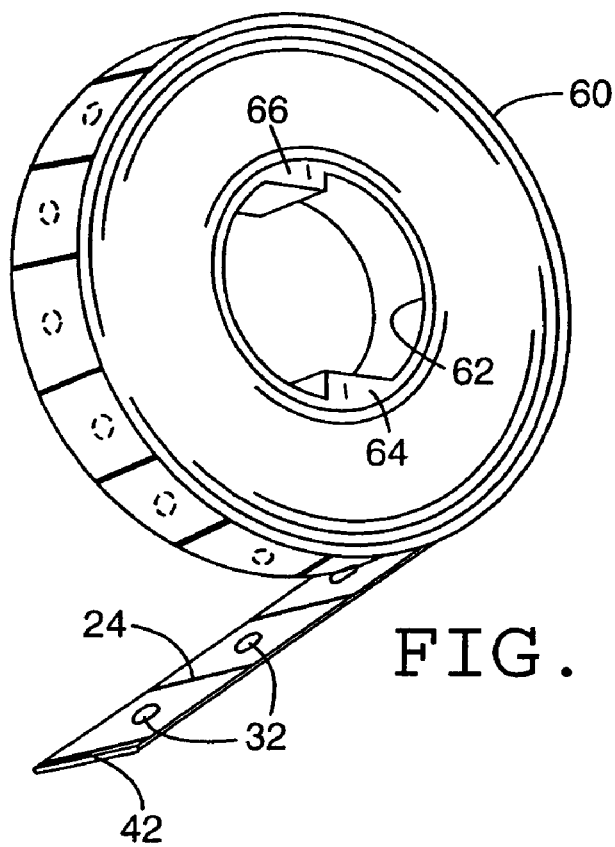
FIG. 5 is an isometric view of a roll of indexed adhesive segment-laden carrier release tape manufactured by the process illustrated in FIG. 1.

Referring now to FIG. 5, a tape roll 60 of the indexed adhesive segment-laden carrier release tape 24 is illustrated with a plurality of dispensable adhesive segments 32 contained thereon. It may be seen that the indexed adhesive segment-laden carrier release tape 24 is wound onto a hollow cylindrical core 62, which may be, for example, made of cardboard, plastic, or the like. The inside of the core 62 has two identically-shaped orientation facilitating segments 64 and 66 mounted or formed therein. The orientation facilitating segments 64 and 66 will be used to facilitate the installation of the tape roll 60 onto a supply spool (to be discussed in detail below) in the proper orientation. Due to the presence and configuration of the orientation facilitating segments 64 and 66 on the inside of the core 62, it will be impossible to place the tape roll 60 onto the supply spool backwards.

Figure 6:
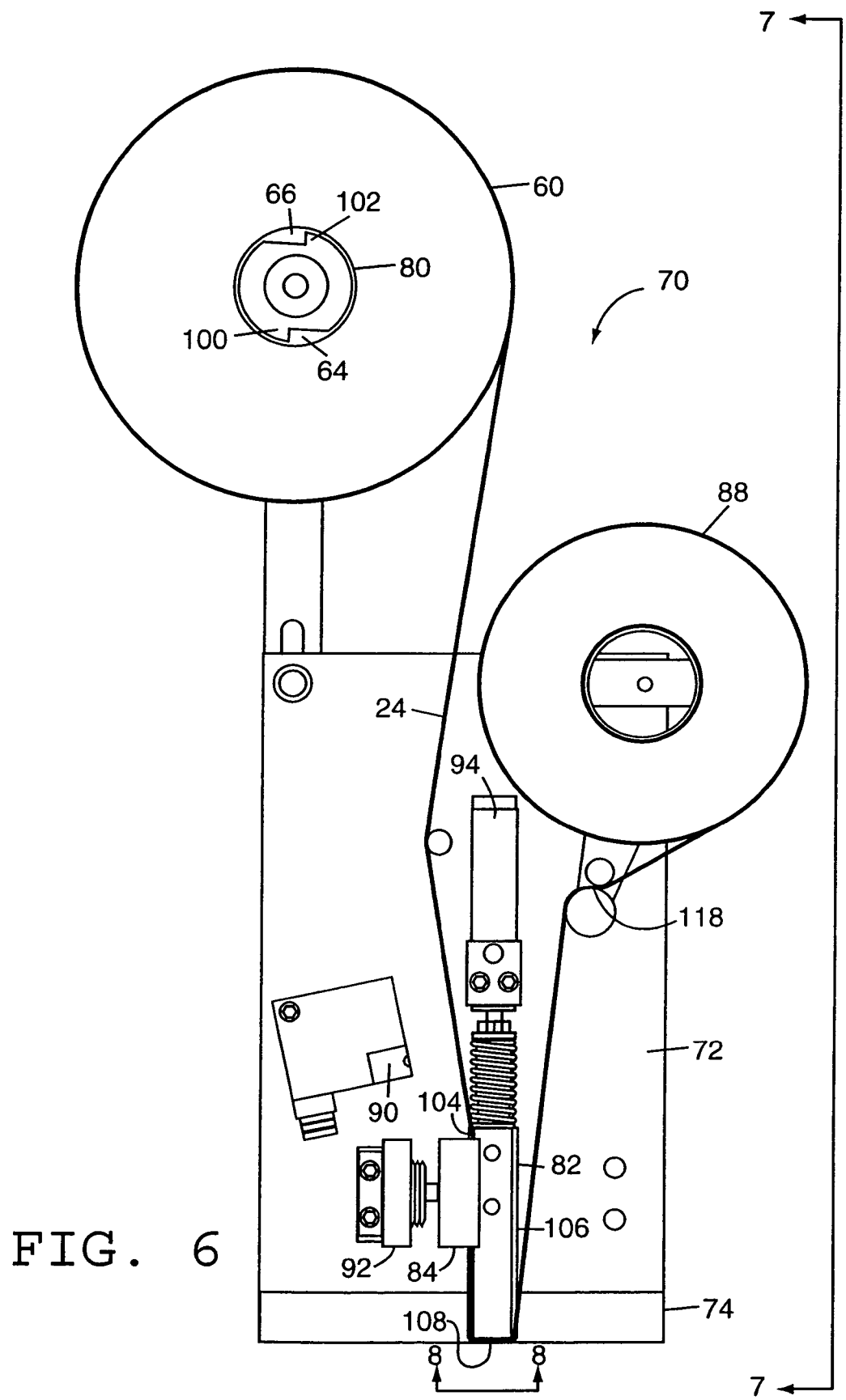
FIG. 6 is a front plan view of an exemplary automated adhesive segment applicator apparatus in accordance with the present invention.
Figure 7:
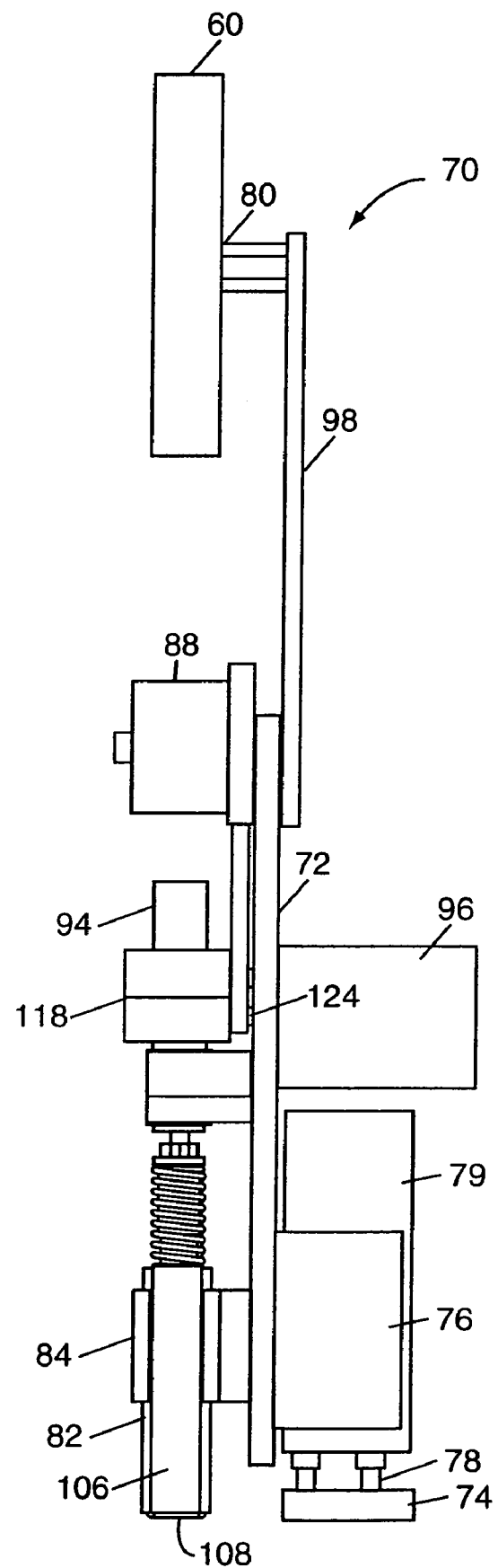
FIG. 7 is a side view of the exemplary automatic adhesive segment applicator apparatus of FIG. 6 as taken along line 7-7 thereof.

An automatic adhesive segment applicator apparatus 70 in accordance with the present invention will now be described in detail first with reference to FIGS. 6 and 7. The various components that form an automatic adhesive segment applicator apparatus 70 in accordance with the present invention are mounted on a movable support structure 72. The movable support structure 72 may be implemented, for example, as a plate shaped structure made of steel, aluminum, or some other appropriate ridged and sturdy material. The support structure 72 is movably mounted with respect to a support structure base 74. For example, the support structure 72 may be movably mounted via an appropriate mounting structure 76 to support rod bearings 78 that are fixedly attached to the support structure base 74. A support structure actuation device 79, such as, for example, a pneumatic air cylinder, or similar device is employed to move the support structure 72, in this case, up and down on the support rod bearings 78 with respect to the support structure base 74.

The main components of the automatic adhesive segment applicator apparatus 70 in accordance with the present invention that are mounted on the support structure 72 include a supply spool 80, a tape guide 82, a tape clamp 84, an applicator head 86 (disposed within the tape guide 82 and illustrated in FIG. 8), a spent tape take up spool 88 and an optical index marking detector 90. Also attached to the support structure 72 are appropriate actuators including, e.g., an air cylinder actuator 92 for actuating the tape clamp 84, an air cylinder actuator 94 for operating the applicator head 86, and a motor 96 for driving the take up spool 88.

The supply spool 80 may be mounted via an extension arm 98 to the support structure 72. The extension arm 98 may be fixedly attached to the support structure 72 in any conventional and convenient manner. The supply spool 80 may be implemented in any conventional manner to support a tape roll 60 of indexed adhesive segment-laden carrier release tape 24, as described above. The supply spool 80 preferably includes orientation facilitating segments 100 and 102 which are sized, shaped, and positioned to engage the corresponding orientation facilitating segments 64 and 66 on the tape roll 60 to ensure that the tape roll 60 can only be mounted on the supply spool 80 in the correct orientation, i.e., the orientation whereby the surface 26 of the carrier release tape 24 having adhesive segments 32 thereon is directed through the adhesive segment indexing applicator apparatus 70 for application to a work piece. The supply spool 80 preferably is implemented to allow rotation of the spool 80 such that the adhesive segment-laden carrier release tape 24 may be unwound from the tape roll 60 as tape is pulled from the roll 60 during normal operation of the adhesive segment applicator apparatus 70. However, preferably enough resistance to rotation is provided, in any conventional manner, to prevent free rotation of the supply spool 80 in other situations, thereby to prevent unintended unwinding of the tape roll 60 mounted on the supply spool 80.

The tape guide 82 is elongated, having two opposed elongated sides 104 and 106 along which the adhesive segment-laden carrier release tape 24 is strung during operation of the adhesive segment applicator 70. The sides 104 and 106 of the tape guide 82 are preferably designed to facilitate such guiding of the carrier release tape 24 around the tape guide 82 past the applicator head 86, which is disposed within the tape guide 82 and which, during operation, extends from an end 108 of the tape guide 82. To facilitate such guidance of the carrier release tape 24 around the tape guide 82, the sides 104 and 106 of the tape guide 82 may be provided with rails 110, or other similar structures, which are spaced apart along the sides 104 and 106 of the tape guide 82 at a distance slightly larger than the width of the adhesive segment-laden carrier release tape 24. Such rails 110 or other structures help to prevent the adhesive segment-laden carrier release tape 24 from slipping off the carrier guide 82 as the adhesive segment-laden carrier release tape 24 is moved through the adhesive segment applicator 70 during operation thereof. The transition 112 between the sides 104 and 106 and end 108 of the tape guide 82 preferably is rounded and smooth to facilitate movement of the adhesive segment-laden carrier release tape 24 around tape guide 82 without causing damage to the tape 24 or unintended peeling of the adhesive segments 32 therefrom.

Figure 8:
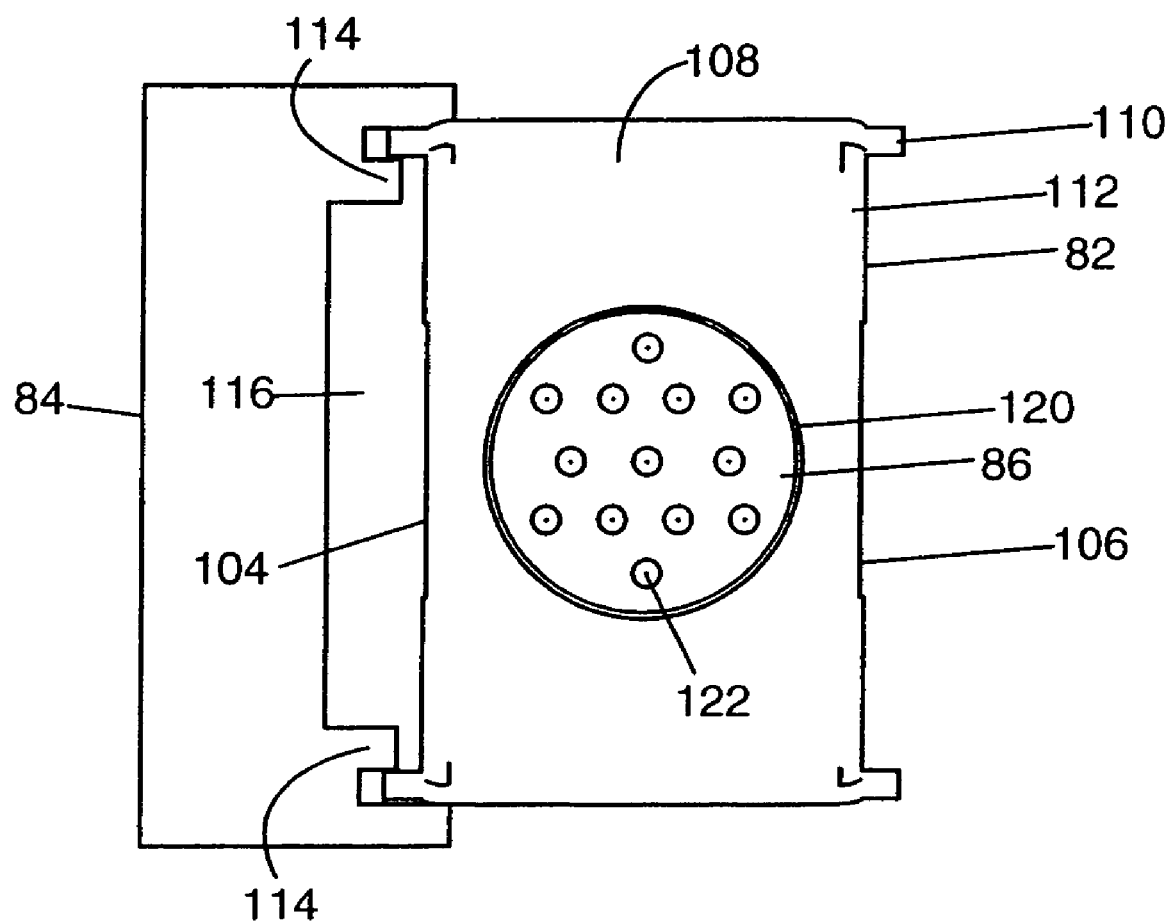
FIG. 8 is a more detailed view of a tape guide, tape clamp, and applicator head of an exemplary adhesive segment applicator apparatus in accordance with the present invention as taken generally along line 8-8 of FIG. 6.

The tape clamp 84 is designed to hold the adhesive segment-laden carrier release tape 24 tightly in position against the tape guide 82 during application of an adhesive segment 32 from the carrier release tape 24 onto a work piece. As illustrated in FIG. 8, the tape clamp 84 preferably includes projections 114 extending therefrom in the direction of a side 104 of the tape guide 82. When the tape clamp 84 is moved in the direction of the tape guide 82, by operation of the tape clamp actuator 92, the tape clamp projections 114 pinch the adhesive segment-laden carrier release tape 24 between the projections 114 and the side 104 of the tape guide 82, thereby preventing movement of the adhesive segment-laden carrier release tape 24. The projections 114 are separated from each other by a distance such that a gap 116 is created between them such that when the clamp 84 is closed against the tape guide 82 the body of the clamp 84 other than the projections 114 remains spaced apart from the tape guide 82, thereby to prevent the tape clamp 84 from contacting the adhesive segments 32 deposited on the adhesive segment-laden carrier release tape 24 passed in between the tape clamp 84 and the tape guide 82. Note that the tape clamp actuator 92 may be implemented in any conventional manner, e.g., using a pneumatic air cylinder with pneumatic and/or spring return.

Note that during operation of the adhesive segment applicator 70 it is important that the adhesive segment-laden carrier release tape 24 be held firmly in position with respect to the applicator head 86 during operation of the applicator head 86 to apply an adhesive segment 32 onto a work piece. This may be achieved, for example, by providing a tape clamp 84 on both sides 104 and 106 of the tape guide 82. Alternatively, a single tape clamp 84 may be employed, as illustrated in FIG. 6, wherein a pinch roller system 118 is provided on the opposite side of the tape guide 82 from the tape clamp 84. A conventional pinch roller system 118 may be employed through which the spent carrier release tape 24, with adhesive segments 32 removed therefrom, is strung and which allows movement of the carrier release tape in only one direction through the controller system 118 onto the take up spool 88.

The applicator head 86 preferably is mounted for axial movement in a bore 120 formed through the tape guide 82 such that the applicator head 86 may be moved in and out of the tape guide 82 to extend from the bore 120 at the end 108 of the tape guide 82. The size and shape of the applicator head 86 preferably corresponds generally to the size of the adhesive segments 32 that are to be applied to the work piece by the head 86. The applicator head 86 preferably includes at least one, and preferably a plurality, of sharp projections 122 extending therefrom. As will be described in more detail below, during operation of the adhesive segment applicator 70 the applicator head actuator 94 is operated to move the applicator head 86 outward from the end of 108 of the tape guide, to contact the side 28 of the carrier release tape 24 opposite an adhesive segment 32 to press the adhesive segment 32 against a work piece to apply the adhesive segment 32 to the work piece. The projections 122 are sized, and the movement of the applicator head 82 is coordinated, to pierce through the carrier release tape 24 behind the adhesive segment 32, preferably without piercing entirely through the adhesive segment 32 into the work piece upon which the adhesive segment 32 is being deposited. The forming of apertures through the release tape 24 in this manner during the application procedure facilitates release of the adhesive segment 32 from the carrier release tape 24 onto the work piece to provide assured application of the adhesive segment 32 to the work piece during the rapid automatic application of adhesive segments 32 to a work piece using the adhesive segment application 70 in accordance with the present invention.

The take up spool 88 may be implemented as a conventional rotatable spool onto which the carrier release tape 24 is wound after the adhesive segments 32 have been removed therefrom. The take up spool 88 may preferably be driven by a motor 96, such as a stepper or servo motor. As illustrated, the take up spool motor 96 may be mounted on the support structure plate 72 on the side thereof opposite the take up spool 88. A drive axle may extend from the motor 96 through the support structure 72 directly to engage and drive the pinch roller system 118. A drive belt 126 connected between the pinch roller system 118 and the take up spool 88 couples the take up spool 88 to the motor 96. In operation, the motor 96 is operated to rotated the pinch roller system 118 and take up spool 88 to pull the carrier release tape 24, which is strung around the tape guide 82, from the tape roll 60 mounted on the supply spool 80.

In accordance with the present invention, an optical index marking detector 90 is employed to detect the index markings 42 formed on the adhesive segment-laden carrier release tape 24. The optical detector 90 may be implemented in any conventional manner, and specifically is selected and implemented to detect the particular type of index marking formed on or in the carrier release tape 24. The optical index marking detector 90 may be mounted in any appropriate and convenient place on the support structure 72 to detect the index markings 42.

Figure 9:
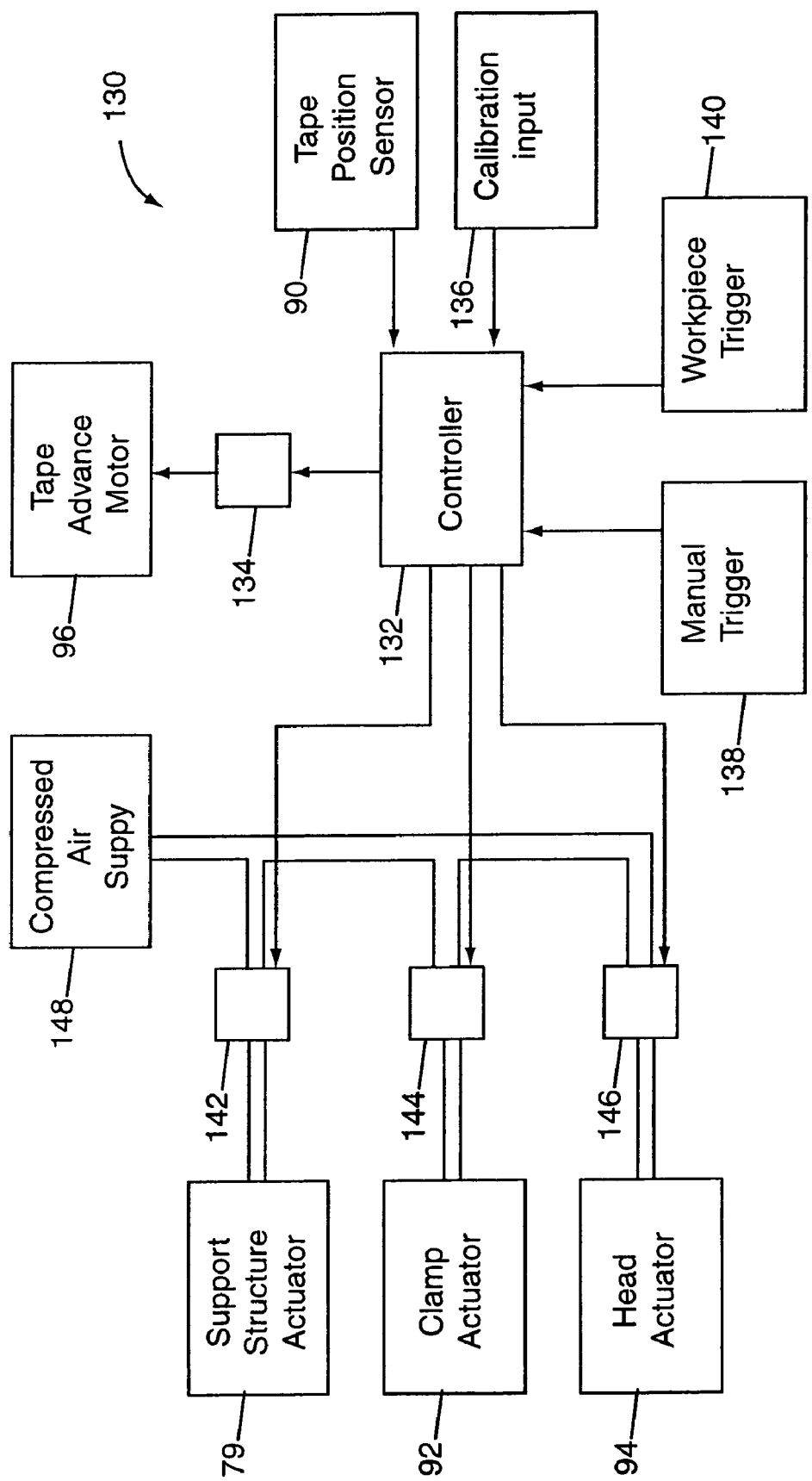
FIG. 9 is a schematic block diagram of an exemplary control system for an automatic adhesive segment applicator apparatus in accordance with the present invention.
Figure 10:
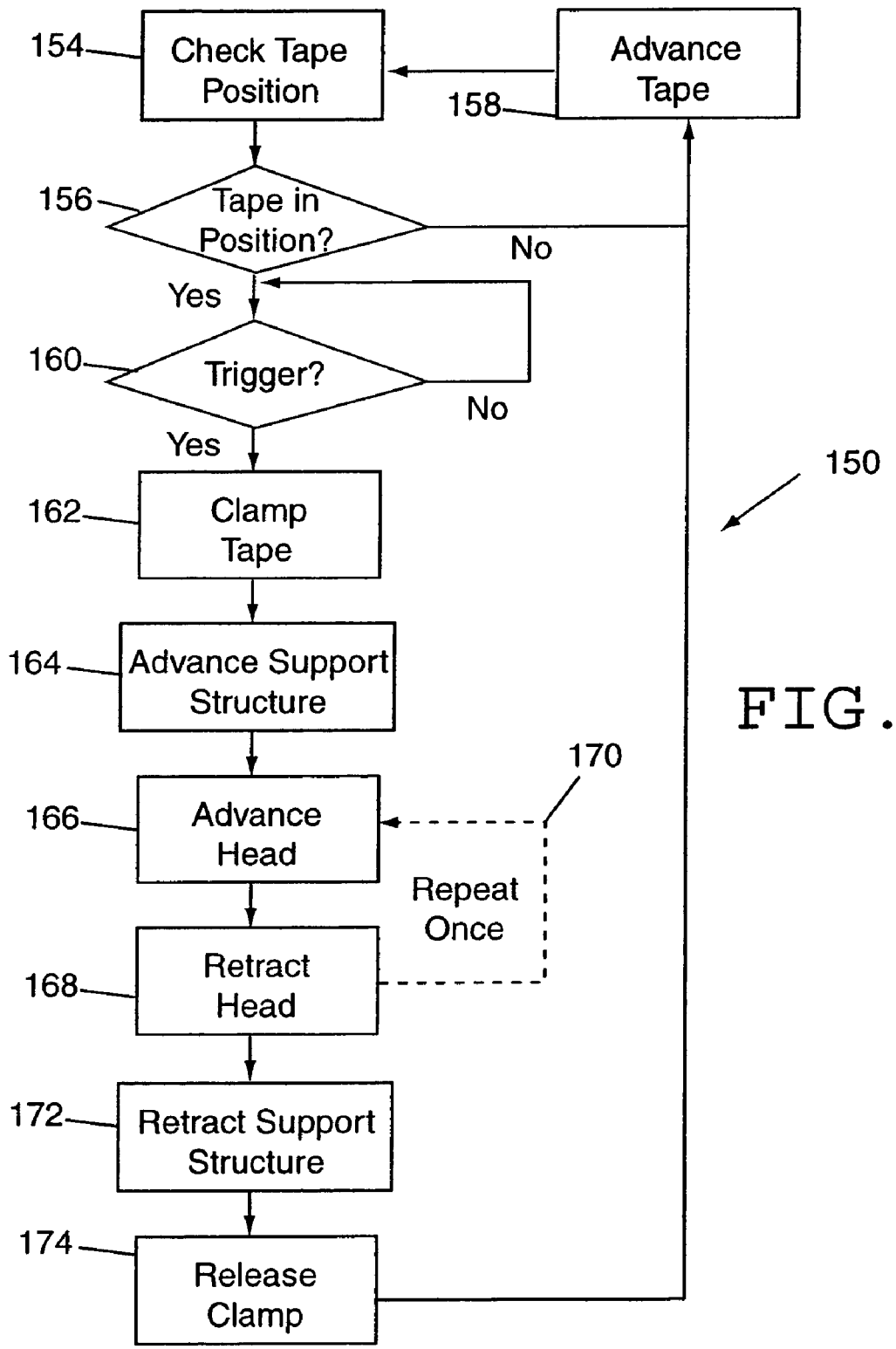
FIG. 10 is a flow chart diagram illustrating an exemplary method for applying a thermoplastic adhesive segment from an adhesive segment-laden carrier release tape onto a work piece using an adhesive segment indexing apparatus in accordance with the present invention.

An exemplary control system 130 for an adhesive segment applicator in accordance with the present invention will now be described in more detail with reference to FIG. 9. The system controller 132 may be implemented in a conventional manner to perform the functions described herein. For example, the controller 132 may be implemented in whole or in part using a microprocessor or other programmable device and/or using in a combination of discreet digital and/or analog circuitry. The controller 132 may, but need not, be mounted to the adhesive segment applicator support structure 72.

The optical index marking detector 90 operates as a tape position sensor which provides an input to the system controller 132 relative to the detected position of the index markings 42 on the carrier release tape 24. The controller 132 processes the signal received from the tape position sensor 90 to determine, in a conventional manner, the position of the adhesive segment-laden carrier release tape 24. Before controlling the applicator 70 to apply an adhesive segment 32 from the carrier release tape 24 onto a work piece, the controller 132 determines, based on the signal received from the tape position sensor 90, whether the adhesive segment-laden carrier release tape 24 is positioned such that an adhesive segment 32 is positioned at the end 108 of the tape guide 82 to be applied to a work piece by the applicator head 86. If an adhesive segment 32 is not in the desired position the controller 132 sends a control signal to the tape advance motor 96, via an appropriate conventional motor controller 134, to rotate the pinch roller system 118 and take up spool 88 to advance the adhesive segment-laden carrier release tape 24 from the supply roll 60 until the signal from the tape position sensor 90 indicates that an adhesive segment 32 is in the desired position. (Preferably a manual calibration input 136 is provided to provide an input to the controller 132 if it is determined by observation that the controller is not properly positioning in adhesive segment in the desired position for application to a work piece.)

Once the adhesive segment-laden carrier release tape 24 is positioned such that an adhesive segment 32 is positioned in an appropriate position at the end 108 of the tape guide 82, the controller sends appropriate control signals to the support structure actuator 79, the tape clamp actuator 92, and the applicator head actuator 94 to control operation thereof in sequence automatically to apply the adhesive segment to a work piece, in a manner to be described in more detail below. This application process may be initiated manually, e.g., by a manual trigger 138 that provides a trigger signal to the controller 132. The manual trigger 138 may be implemented, for example, as a hand or foot operated switch that provides a trigger signal to the controller to initiate the adhesive segment application process when an operator has positioned a work piece in a desired position or notes that a work piece is in the desired position for the application for an adhesive segment 32 thereto. Alternatively, the adhesive segment application process may be initiated automatically by a conveyor or other work piece related trigger system 140. For example, such a work piece trigger 140 may provide a trigger signal to initiate the application of an adhesive segment 32 onto a work piece using a conventional system for detecting the presence of a work piece in the appropriate position relative to the adhesive segment applicator 70. Such an automatic work piece trigger 140 may, particularly, be employed in an assembly line like setting.

As described previously, a support structure actuator 79, tape clamp actuator 92, and applicator head actuator 94 may be implemented using pneumatic air cylinder type actuators. In such a case, the control signals provided to operate such actuators are provided by the controller 132 to appropriate corresponding switching devices 142, 144, and 146 to direct compressed air, from a compressed air supply 148, to the appropriate air cylinder actuators 79, 92, and 94 to operate the actuators at the desired time and in the desired manner. Note that preferably a single compressed air supply 148 may be used to provide operation of all of the air cylinder actuators 79, 92, and 94 employed in the applicator apparatus 70.

An exemplary process for operating an adhesive segment applicator system in accordance with the present invention to apply an adhesive segment 32 from an adhesive segment-laden carrier release tape 24 onto a work piece 152 now will be described with reference to the exemplary flow chart diagram of FIG. 10 and FIGS. 11-14. FIGS. 11-14 illustrate, schematically, relative positions of the adhesive segment-laden carrier release tape 24, tape guide 82, tape clamp 84, applicator head 86, and work piece 152 at various points during the adhesive segment applicator operation.

The system controller 132 first employs the signal provided from the tape position sensor 90 to determine 154 the position of the tape 24 in the adhesive segment applicator apparatus 70. Specifically, the controller employs the tape position sensor signal 90 to determine if the tape is in a position 156 such that an adhesive segment 32 is positioned at the end 108 of the tape guide 82, in front of the opening of the bore 120 in which the applicator head 86 is positioned. If the adhesive segment-laden carrier release tape 24 is not in the desired position, the controller sends the appropriate signals to the tape advance motor 96 to advance the tape 158 until the signal from the tape position sensor 90 indicates that the tape is in the desired position.

The controller 132 then waits for a trigger signal 160. As discussed above, the trigger signal may be provided manually by an operator or automatically by a work piece positioning or detection system when the work piece 152 is in the desired position for application of adhesive segment thereto. While the controller awaits for the trigger signal with the adhesive segment-laden carrier release tape positioned with an adhesive segment 32 ready for application to the work piece 152 the apparatus components are in the position illustrated in FIG. 11.

After receiving a trigger signal, indicating that a work piece is in position for an adhesive segment to be applied thereto, the controller 132 sends a signal to the tape clamp actuator 92 to actuate the tape clamp 84 thereby to clamp 162 the adhesive segment-laden carrier release tape 24 position such that the tape 24 in the area of the adhesive segment 32 to be applied to the work piece does not move.

With the tape clamped, the controller 132 sends a signal to the support structure actuator 79 to lower the support structure 72 to bring the adhesive segment 32 to be applied to the work piece 152 in contact with the work piece 152. After clamping 162 the tape and lowering 164 the support structure 72 the apparatus is in the position illustrated in FIG. 12.

The controller 132 then provides a signal to the applicator head actuator 94 to lower 166 the actuator head 86 rapidly against the side of the carrier release tape 24 opposite the adhesive segment 32. This operation, illustrated in FIG. 13, presses the adhesive segment 32 against the work piece 152, thereby to apply the adhesive segment 32 onto the work piece 152. Simultaneously, the sharp projections 122 provide one or more perforations through the release tape 24, preferably without piercing through the adhesive segment 32 into the work piece 152. The controller 132 may then send the appropriate signal to the applicator head actuator 94 to retract 168 the applicator head back into the tape guide 82. It is believed that the piercing of holes or apertures through the release tape 24 behind the adhesive segment 32 prevents air pressure behind the adhesive segment 32 as the applicator head 86 is retracted from tending to pull adhesive segment 32 back off of the work piece 152 to which it has been applied. Thus, providing one or more perforations through the carrier release tape 24 behind the adhesive segment 32 assures removal of the adhesive segment 32 from the release tape 24 and complete application thereof to the work piece 152.

Preferably the step of extending 166 and retracting 168 the applicator head 86 may be repeated 170 rapidly at least once for each adhesive segment 32 to be applied to a work piece. This further assures release of the adhesive segment 32 from the carrier release tape 24 onto the work piece 152.

After the applicator head 86 has been operated to apply the adhesive segment 32 onto the work piece 152, the controller 132 may send a control signal to the support structure actuator 79 to raise the support structure 72 back to its starting position and may send a signal to the tape clamp actuator 92 to release 174 the tape clamp 92 to allow movement of the adhesive segment-laden carrier release tape 24. Having applied an adhesive segment 32 onto the work piece 152, the controller 132 may then send a control signal to the tape advance motor 96 to advance the adhesive segment-laden carrier release tape 24 to position the next adhesive segment on the carrier release tape in the proper position for application to a work piece, as illustrated in FIG. 14. As discussed above, the, e.g., optical tape position sensor 90 may be employed to detect the index markings 42 on the carrier release tape 24 to ensure that the next adhesive segment 32 on the carrier release tape 24 is in the proper position.

It should be understood that the present invention is not limited to the particular exemplary applications and embodiments illustrated and described herein. In particular, although the exemplary adhesive segment applicator apparatus 70 illustrated and described herein moves in a generally vertical, up and down, direction with respect to a work piece 152 position below the applicator 70, an adhesive segment applicator apparatus in accordance with the present invention may be positioned in any direction with respect to a work piece and oriented and operated with respect thereto to apply an adhesive segment from an adhesive segment carrier release tape onto the work piece in accordance with the present invention.

What is claimed is:

1. A method for applying adhesive segments from an adhesive segment-laden carrier release tape onto a work piece, comprising:
    (a) providing an adhesive segment dispensing tape, including:
        (i) a flexible carrier release tape extending longitudinally and having a transverse width, said flexible carrier release tape also having opposed first and second release surfaces;
        (ii) a plurality of adhesive segments arrayed non-contiguously in a longitudinally spaced-apart progression along the first release surface of the carrier release tape, consecutive ones of the adhesive segments being spaced longitudinally apart by a predetermined and substantially uniform distance on the first release surface of the carrier release tape, wherein each of the adhesive segments is configured to adhere to a surface after release from the carrier release tape and to support an object attached to the adhesive segment; and
        (iii) a plurality of optically detectable indices on at least one of the first and second release surfaces of the carrier release tape and in a uniformly spaced apart longitudinal progression on the carrier release tape, wherein each of the optically detectable indices is in the same relative position on the carrier release tape with respect to at least one corresponding adhesive segment but wherein each of the optically detectable indices does not contact the at least one corresponding adhesive segment;
    (b) providing the adhesive segment dispensing tape to an adhesive segment dispensing apparatus, the adhesive segment dispensing apparatus having a dispensing location for receiving the dispensing tape with the plurality of adhesive segments arrayed thereon, wherefrom adhesive segments are applied directly from the dispensing tape onto the work piece;
    (c) automatically detecting, with a single optical detector mounted on the adhesive segment dispensing apparatus in a fixed relationship to the dispensing tape, at least a one of the detectable indices on the at least one of the first and second release surfaces of the carrier release tape and automatically moving the adhesive segment dispensing tape to position an adhesive segment on the dispensing tape at the dispensing location on the adhesive dispensing tape apparatus using the detected at least one of the detectable indices; and
    (d) applying the adhesive segment at the dispensing location onto a work piece.

2. The method of claim 1 wherein the plurality of detectable indices are optically detectable indices on the first release surface of the carrier release tape.

3. The method of claim 1 wherein the plurality of detectable indices are optically detectable indices printed onto the carrier release tape.

4. The method of claim 3 wherein the plurality of optically detectable indices are visible lines printed on the carrier release tape and extending transversely across the carrier release tape.

5. The method of claim 1 wherein the plurality of detectable indices are positioned on the carrier release tape such that each of the detectable indices is positioned in between adjacent adhesive segments on the carrier release tape.

6. The method of claim 1 wherein the plurality of detectable indices are perforations formed extending through the release tape.

7. The method of claim 1 comprising additionally a plurality of perforations extending through the carrier release tape and positioned in a longitudinally spaced-apart progression along the length thereof in positions thereon to coincide with the positions of the adhesive segments thereon.

8. The method of claim 1 wherein applying the adhesive segment at the dispensing location onto a work piece is performed automatically.

9. The method of claim 1 wherein applying the adhesive segment at the dispensing location onto a work piece includes perforating the carrier release tape in a location thereon corresponding to the adhesive segment being applied to the work piece.

10. A method for applying adhesive segments from an adhesive segment-laden carrier release tape onto a work piece, comprising:
    (a) providing an adhesive segment dispensing tape, including:

(i) a flexible carrier release tape extending longitudinally and having a transverse width, said flexible carrier release tape also having opposed first and second release surfaces; and (ii) a plurality of adhesive segments, each segment having first and second tacky surfaces, arrayed non-contiguously in a longitudinally spaced-apart progression along the first release surface of the carrier release tape, consecutive ones of the adhesive segments being spaced longitudinally apart by a predetermined and substantially uniform distance on the first release surface of the carrier release tape;

(b) providing the adhesive segment dispensing tape to an adhesive segment dispensing apparatus, the adhesive segment dispensing apparatus having a dispensing location that accommodates the carrier tape with the plurality of adhesive segments arrayed thereon, wherefrom adhesive segments are applied directly from the dispensing tape onto the work piece;

(c) automatically detecting, with a single optical detector mounted on the adhesive segment dispensing apparatus in a fixed relationship to the dispensing tape, a position of at least one of the adhesive segments on the adhesive segment dispensing tape and automatically moving the adhesive segment dispensing tape to position an adhesive segment on the dispensing tape at the dispensing location on the adhesive dispensing tape apparatus using the detected position of the at least one of the adhesive segments; and (d) applying the adhesive segment on the carrier tape at the dispensing location onto a work piece; wherein each of the adhesive segments is configured to adhere with the first tacky surface to the work piece and support an object attached to the second tacky surface.

11. The method of claim 10 comprising additionally a plurality of perforations extending through the carrier release tape and positioned in a longitudinally spaced-apart progression along the length thereof in positions thereon to coincide with the positions of the adhesive segments thereon.

12. The method of claim 10 wherein applying the adhesive segment at the dispensing location onto a work piece is performed automatically.

13. The method of claim 10 wherein applying the adhesive segment at the dispensing location onto a work piece includes perforating the carrier release tape in a location thereon corresponding to the adhesive segment being applied to the work piece.

* * * * *